United States Patent Office 3,284,375
Patented Nov. 8, 1966

3,284,375
EPOXY CONTAINING CONDENSATION PRODUCTS AND METHOD OF MAKING SAME
Edward C. Shokal, Walnut Creek, Calif., assignor to Shell Oil Company, a corporation of Delaware
No Drawing. Filed Sept. 3, 1954, Ser. No. 454,203
18 Claims. (Cl. 260—2)

This invention relates to a new class of polymeric products and to their preparation. More particularly, the invention relates to new epoxidized polymeric products, to a method for their preparation, and to the use of the new epoxidized products, particularly in the preparation of improved coating compositions.

Specifically, the invention provides new and particularly useful epoxidized polymeric products obtained by epoxidizing unsaturated condensation polymers and particularly those having a main polymer chain containing, in addition to carbon, at least one element of the group consisting of oxygen, nitrogen, silicon, phosphorus and sulfur, dispersed in at least two different locations in the said chain, containing a plurality of internal aliphatic carbon to carbon unsaturated linkages, at least two of said unsaturated linkages being converted during the epoxidation to

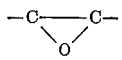

groups.

The invention further provides cured products obtained by treating the above-described epoxidized polymeric products alone or in combination with other epoxy-containing materials with epoxy curing agents, such as amines, polycarboxylic acids, polymercaptans and the like.

Unsaturated polymeric condensation products, such as unsaturated alkyds and unsaturated polyamides, are useful in the preparation of surface coatings, laminates and the like, as they can be cured through the unsaturated linkages to form insoluble infusible products. Many of these materials, however, and particularly those wherein the double bonds are in a non-conjugated relationship, have rather limited utility because they are quite difficult to cure. In addition, many of these unsaturated polymeric products have limited solubility in oils and solvents and limited compatibility with other film forming materials and this places considerable limitation on the amount of such materials that can be tolerated in coating compositions. Many of these products are also unsuited for use in other applications, such as in the formation of fibers, as they are relatively inert to further treatment such as dyeing.

It is an object of the invention, therefore, to provide new polymeric products. It is a further object to provide new epoxidized polymeric condensation products and a method for their preparation. It is a further object to provide new polymeric products that may be more easily cured or cross-linked to form insoluble infusible products. It is a further object to provide new polymeric products which have improved solubility and compatibility characteristics. It is a further object to provide new polymeric products which can be further reacted to produce modified polymeric products. It is a further object to provide epoxidized unsaturated alkyds which are particularly useful in preparing coating compositions and potting compositions. It is a further object to provide epoxidized unsaturated polyamides and unsaturated polyurethanes which are particularly useful in industry. Other objects and advantages of the invention will be apparent from the following detailed description thereof.

It has now been discovered that these and other objects may be accomplished by the novel products of the invention comprising epoxidized polymeric products obtained by epoxidizing unsaturated condensation polymers and particularly those having a main linear polymer chain containing, in addition to carbon, at least one element of the group consisting of oxygen, nitrogen, silicon, phosphorus, and sulfur, dispersed in at least two different locations in the said chain, containing a plurality of internal aliphatic carbon to carbon unsaturated linkages, at least two of said unsaturated linkages being converted during the epoxidation to

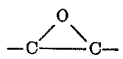

groups. These epoxidized polymeric products have been found to possess many unusual and unexpected properties not possessed by the unsaturated polymeric products and find wide use in the chemical and related industries. The epoxidized polymeric products described above, for example, have greatly improved solubility and compatibility characteristics and can be combined in much larger amounts with coating solvents and synthetic resins than was possible with the unsaturated polymeric products. In addition, the epoxidized polymeric products may be easily modified through reaction with monofunctional agents, such as drying oil fatty acids, monoamines and the like, to form polymeric products having new and improved properties. Furthermore, these epoxidized polymeric products or their modified derivatives may be easily cured through treatment with polyfunctional curing agents such as polycarboxylic acids, polyamines and the like, to form harder and more resistant coatings. As indicated hereinafter, the epoxidized polymeric products of the invention also find application in the preparation of adhesive compositions and in the preparation of pottings and castings.

The unsaturated polymeric products to be epoxidized according to the present invention are the unsaturated condensation polymers possessing a plurality of internal aliphatic carbon-to-carbon unsaturated linkages. The unsaturated linkages are preferably ethylenic linkages but may be of the acetylenic type. By the expression "condensation polymer" is meant those polymers formed by elimination of a molecule of a component such as, for example, water, HCl, etc., from two molecules of reactant as distinguished from say other polymers formed by the addition of two molecules of reactants through opening up of unsaturated linkages (addition polymerization). These condensation polymers will have main polymer chains containing, in addition to carbon other elements, and particularly at least one element of the group consisting of oxygen, nitrogen, silicon, phosphorus and sulfur dispersed in at least two different locations in the said chain. The expression "polymer" as used herein refers generically to homopolymers as well as copolymers.

One group of unsaturated polymeric products which may be epoxidized according to the present invention includes the unsaturated alkyd resins, i.e., reaction products of polybasic acids or anhydrides and polyhydric alcohols, both modified and unmodified. In this case, the main carbon chain will contain a plurality of

linkages, and the unsaturated linkages to be epoxidized may be contained in the acid and/or alcohol portion of the molecule and/or in the modifier portion of the molecule.

A preferred group of such unsaturated alkyds are those obtained by using unsaturated polybasic acids or anhydrides in the preparation of the alkyds. Examples of these unsaturated acids include, among others, maleic acid,
aconitic acid,
2-butenedioic acid,
4-cyclohexene-1,2-dicarboxylic acid,
endomethylene 3,6-tetrahydrophthalic acid,
3-acetoxy-4-cyclohexene-1,2-dicarboxylic acid,
3-hexyl-4-cyclohexene-1,2-dicarboxylic acid,
4,5-dimethyl-4-cyclohexene-1,2-dicarboxylic acid,
1,4-cyclohexadiene-1,2-dicarboxylic acid,
6-ethyl-1,4-cyclohexadiene-1,2-dicarboxylic acid,
3-butyl-1,4-cyclohexadiene-1,2-dicarboxylic acid,
3,6-dimethyl-1,4-cyclohexadiene-1,2-dicarboxylic acid,
3-methyl-3,5-cyclohexadiene-1,2-dicarboxylic acid,
1,2-dimethyl-3,5-cyclohexadiene-1,2-dicarboxylic acid,
3-octadecenylsuccinic acid,
eicosenyl-succinic acid,
hexadecadienylsuccinic acid,
octadecadienylsuccinic acid,
dimerized linoleic acid,
8,10-eicosadieneioic acid,
8,14-eicosadienedioic acid, and
8,12-octadecadienedioic acid.

Preferred unsaturated polycarboxylic acids to be used in preparing the above-noted alkyds comprise the mono- and poly-ethylenically unsaturated aliphatic dicarboxylic acids containing no more than 25 carbon atoms and the mono- and poly-ethylenically unsaturated cycloaliphatic dicarboxylic acids containing no more than 15 carbon atoms. Of special interest are the alkenoic acids, alkadienedioic acids containing from 4 to 12 carbon atoms.

The polyhydric alcohols to be reacted with the above-noted unsaturated polycarboxylic acids may be any di-, tri- or polyhydric alcohol which may be aliphatic, cycloaliphatic, aromatic or heterocyclic. Examples of such alcohols include, among others, ethylene glycol, diethylene glycol, triethylene glycol, 1,5-pentanediol, 1,6-hexanediol, 3-ethyl-hexanediol-1,3, glycerol allyl ether, glycerol phenyl ether, butanediol-1,4, thiodipropanol, sulfonyldipropanol, glycerol monoacetate, 2,5-dimethyl, 2,6-heptanediol, glycerol, hexanetriol, pentaerythritol, mannitol, methyltrimethylolmethane, 1,4,6-octanetriol, polypentaerythritol, polyallyl alcohol, polyvinyl alcohol, trihydroxybenzene, 3,5-dithiooctanetriol, polyols formed by the condensation of bis-phenols with epichlorohydrin, and the like. Particularly preferred alcohols comprise the aliphatic and cycloaliphatic dihydric alcohols containing no more than 10 carbon atoms, and especially the alkanediols and cycloalkanediols containing no more than 8 carbon atoms.

Another preferred group of unsaturated alkyds are those obtained by reacting an unsaturated polyhydric alcohol with a polycarboxylic acid or anhydride. Examples of such unsaturated polyhydric alcohols include, among others;

2-butenediol-1,4,
2-(hydroxymethyl)-1-propen-3-ol,
2-(hydroxymethyl)-1-buten-3-ol,
2-(1-hydroxyethyl)-1-buten-3-ol,
1-butene-3,4-diol,
1-penten-3,5-diol,
1-pentene-3,4-diol,
2-methyl-1-butene-3,4-diol,
1,5-hexadiene-3,4-diol,
2-(hydroxymethyl)-2-butene-4-ol,
2-methyl-2-pentene-1,4-diol,
2,3-dimethyl-2-butene-1,4-diol,
2-pentene-1,5-diol,
3-hexene-2,6-diol,
2,5-dimethyl-3-hexene-2,5-diol,
1-hexene-5,6-diol,
1-heptene-4,6,7-triol,
2,6-dimethyl-6-octene-2,3,8-triol,
2,6-dimethyl-7-octene-2,3,6-triol and
cyclohexenediol-2,5

The preferred unsaturated polyhydric alcohols are the aliphatic and cycloaliphatic ethylenically unsaturated di-, tri- and polyhydric alcohols containing no more than 18 carbon atoms, and more preferably the open-chain aliphatic ethylenically unsaturated di- and trihydric alcohols containing no more than 12 carbon atoms. Coming under special consideration are the alkenediols and the alkenetriols containing up to 8 carbon atoms.

The polybasic acids and anhydrides to be reacted with the above-described unsaturated polyhydric alcohols may be any di-, tri- or polycarboxylic acids or anhydrides which may be aliphatic, cycloaliphatic, aromatic or heterocyclic. Examples of such polybasic acids include, among others, malonic, succinic, glutaric, suberic, citric, cyclohexanedicarboxylic, phthalic, isophthalic, terephthalic, 1,8-naphthalenic, adipic, sebacic, azelaic, pimelic, chlorosuccinic, dichlorophthalic, tetrachloro phthalic, hexachloro endomethylene tetrahydrophthalic acid, dilatic, benzophenone-2,4'-dicarboxylic acid, thiodipropionic acid, sulfonyldipropionic acid, oxydipropionic acid, 4,6-dithiadodecanedioic acid, 8,10-dioxadodecanedioic acid, dicarboxydibenzylbenzene, di(carboxyphenylethyl) isopropylbenzene, and their mixtures.

Other alkyds that may be used in the preparation of the novel epoxidized products but are less preferred than the above alkyds are those obtained by employing an unsaturated polycarboxylic acid or anhydride as described above with an unsaturated polyhydric alcohol described above, or by reacting a mixture of saturated and unsaturated polycarboxylic acids or anhydrides with a saturated or unsaturated polyhydric alcohol, or alternatively by reacting a saturated or unsaturated polycarboxylic acid or anhydride with a mixture of saturated and unsaturated polyhydric alcohols.

Modified unsaturated alkyd resins may also be used in the preparation of the claimed epoxidized alkyds. The products include modified alkyds obtained by using modifiers in the preparation of the above-described unsaturated alkyds or by using unsaturated modifiers in the preparation of alkyds from saturated polycarboxylic acid and saturated polyhydric alcohols as described above. Modifiers used in such preparations include monohydric alcohols, such as, for example, propanol, butanol, allyl alcohol, tertiary butanol, hexanol, octanol, dodecanol, dodecenol, cyclohexenol, methyl cyclohexanol, and monocarboxylic acids, such as lactic acid, benzoic acid, chlorobenzoic acid, salicyclic acid, tert-butylbenzoic acid, acrylic acid, cyclohexanecarboxylic acid, vinylacetic acid, allylacetic acid, tetrolic acid, ethyl propionic acid, vinyl acrylic acid, sorbic acid, butyric acid, stearic acid, palmitic acid, glycolic acid, chloroacetic acid, chloropropionic acid and the like. Particularly preferred modifiers include the fatty acids obtained from drying oils and semi-drying oils, such as the acids derived from soyabean, linseed, perilla, fish, tung, sunflower, oiticica and dehydrated castor oils.

Other modified unsaturated alkyd resins that may be used in preparing the claimed epoxidized alkyds are those obtained by polymerizing the above-noted unsaturated alkyds with polyunsaturated monomers, such as pentadienes, butadienes and the like.

The unsaturated alkyds described above may be prepared by any suitable process. They are preferably prepared by merely heating the desired polybasic acid, or anhydride, polyhydric alcohol and modifying agent (if desired) preferably in an inert atmosphere. Ordinarily no catalysts need be employed to effect this reaction, but, if desired, substances, such as sulfuric acid, p-toluenesulfonic acid, zinc chloride, stannic chloride, calcium acetate, barium acetate, and the like, in amounts varying from about 0.1% to 5% by weight of reactants may be employed.

The proportions of reactants to be used in the alkyd formation will vary depending upon the properties desired in the finished product. Ordinarily the polycarboxylic acid will be reacted with at least a chemical equivalent amount of the polyhydric alcohol. A "chemical equivalent amount" as used here in this regard refers to that amount of alcohol needed to furnish one OH group for every carboxyl group. Preferably one reacts the acid with an excess up to 50% excess of the alcohol.

If modifying agents are employed, they are preferably utilized in amounts varying from 1% to 80 or 90% by weight of the alkyd resin. If the drying or semi-drying oil fatty acids are utilized as the modifying agent, they are preferably utilized in amounts varying from about 25% to 65% by weight of the resin.

The alkyd may be prepared in the presence or absence of solvents or diluents. If solvents are employed, it is desirable to utilize inert organic compounds, such as benzene, toluene, xylene, cyclohexane, and the like, and mixtures thereof.

Temperatures employed during the formation of the alkyds will vary depending upon the reactants. In most cases, the temperature will range from about 100° C. to 250° C., with a preferred range being between 200° C. and 250° C.

It is preferred to accomplish the preparation of the alkyds under a blanket of inert gas, at least during the initial stages of the reaction. By an inert gas is meant one substantially devoid of molecular oxygen, such as nitrogen, carbon dioxide, helium, methane, and the like.

The water formed during the reaction may be removed during the reaction or at its completion. It is preferably removed during the course of the reaction substantially as fast as it is formed therein. The removal of water may be accomplished by any suitable method, such as azeotropic distillation with components, such as xylene and benzene. The water may also be removed by the passage of the inert gas, such as carbon dioxide, through the reaction mixture.

Since the unsaturated alkds are convertible, care should be taken during the reaction to avoid converting the resins to a step beyond that of being fusible. This may occur if the reaction mixture is overheated or heated too long. To avoid such difficulty, the course of the reaction is conveniently followed by making determinations of the viscosity and acid number upon samples withdrawn from the reaction mass or by other well known methods. Ordinarily the heating is continued until the viscosity has reached the desired value and the acid number has been reduced to a value about 3 and 30.

When the reaction is substantially complete as shown by the above-described methods, the inert solvents or diluents, reamining water, uncombined reactants and by-products are preferably removed from the reaction mixture. Removal is conveniently accomplished by vacuum distillation, although fractional distillation, precipitation, etc., may also be utilized.

The preparation of several examples of the above-described unsaturated alkyds is given below.

POLYESTER A

About 560 parts of dimetrized linoleic acid was mixed with 74 parts of ethylene glycol and 1 part of p-toluene sulfonic acid and the mixture heated to 170° C. and then held in the range of 170° C. to 250° C. until the reaction was complete. A slow stream of carbon dioxide was sent through the charge to eliminate the air and carry away the water of esterification. The excess glycol was then removed under reduced pressure. The resulting product was a brown solid alkyd resin having acid No. 9.

POLYESTER B

About 146 parts of adipic acid and 113 parts of 2-butenediol-1,4 were mixed together and the mixture heated to 200° C. and held at that temperature until the reaction is complete. A slow stream of carbon dioxide was sent through the charge to eliminate the air and carry away the water of esterification. The excess butenediol-1,4 was then removed under reduced pressure. The resulting product was a brown solid resin.

POLYESTER C

About 148 parts of phthalic anhydride, 102 parts of glycerol and 282 parts of soybean fatty acids were added to 100 parts of xylene as azeotroping agent. The mixture was upheated to 250° C. in 2 hours and held at that temperature for 5 hours. The reaction mixture was then diluted with xylene to form a mixture having a solids concentration of 48.9%. The acid number, on basis of solids was 8.

POLYESTER D

About 150 parts of diethylene glycol and 116 parts of maleic acid and 1 part of phosphoric acid are mixed together and the mixture heated to 170° C. and held at that temperature until the acid number has been reduced below 30. A slow stream of carbon dioxide is sent through the charge to eliminate the air and carry away the water of esterification. The excess diethylene glycol is removed under reduced pressure. The resulting product is a light brown solid alkyd resin.

Another group of unsaturated polymeric products, related to the above-described unsaturated alkyds, which may be epoxidized according to the process of the invention include the polyesters obtained by polymerizing hydroxy-substituted acids. In this case, the main carbon chain will contain a plurality of $$-\overset{O}{\underset{}{\overset{\|}{C}}}O-$$

linkages, with the unsaturated linkages being contained in the hydroxy-substituted acid portion of the molecule. Hydroxy-substituted acids that may be used in preparing these polyesters include, among others, 4-hydroxy-2-butenoic acid, 5-hydroxy-3-heptenoic acid, 4,6-dihydroxy-3-dodecenoic acid, and the like. Particularly preferred members of this group comprise the hydroxy-substituted alkenoic acids containing no more than 10 carbon atoms. The polyesters may be prepared from these hydroxy-substituted acids in the same manner as described above for the preparation of the unsaturated alkyd resins.

Another group of unsaturated polymeric products which may be epoxidized according to the present invention include the unsaturated polyamides, i.e., reaction products of polybasic acids and polyamines. In this case, the main carbon chain will contain a plurality of $$-\overset{O}{\underset{}{\overset{\|}{C}}}N-$$

linkages and the unsaturated linkages to be expoxidized may be contained in the acid and/or amine portion of the molecule and/or in any modifying portion of the molecule.

A preferred group of such unsaturated polyamides are those obtained by reaction of unsaturated polybasic acids with polyamines. These acids are exemplified by the same acids listed above for use in preparing unsaturated alkyd resins. Preferred unsaturated polybasic acids to be used in preparing the polyamides comprise the mono- and polyethylenically unsaturated aliphatic dicarboxylic acids containing no more than 25 carbon atoms, and the mono- and polyethylenically unsaturated cycloaliphatic dicarboxylic acids containing no more than 15 carbon atoms. Of special interest are the alkenedioic acids, alkadienedioic acids containing from 4 to 12 carbon atoms.

The polyamines to be reacted with the above-noted unsaturated polycarboxylic acids may be any di-, tri- or polyamine which may be aliphatic, cycloaliphic, aromatic or heterocyclic. Examples of such amines, include, among others, 1,4-butanediamine, 1,5-pentanediamine, 1,6-hexanediamine, 1,4-cyclohexanediamine, 1,3-benzenediamine, 1,2,3-benzenetriamine, 3,3'-diphenyldiamine, 3,4-diphenyldiamine, diethylenetriamine, 2,6-diaminopyridine, 2,5-diamino-1,3,4-thiadiazole 2,5-diaminopyrrole, 3-chloro-1,5-pentanediamine, 4-chloro-1,8-octanediamine, and the like. Particularly preferred polyamines of this type to be used are the aliphatic, cycloaliphatic and aromatic diamines containing no more than 12 carbon atoms, and more particularly the alkanediamines, cycloalkanediamines and diamino-substituted aromatic hydrocarbons containing no more than 10 carbon atoms.

Other preferred unsaturated polyamines to be used in preparing the novel epoxidized polymeric products are those obtained by reacting an unsaturated polyamine with a polybasic acid. Examples of these unsaturated amines include, among others, 2-pentene-1,5-diamine, 3-pentene-1,5-diamine, 2-hexene-1,6-diamine, 3-cyclohexene-1,4-diamine, 3 - chloro - 4-octene-1,8-diamine, 3-hexene-1,6-diamine, 3-dodecene-1,4,10-triamine and 2-methoxy-4-octene-1, 8-diamine. The preferred unsaturated polyamines to be used for this purpose include the aliphatic and cycloaliphatic ethylenically unsaturated di- and triamines containing no more than 18 carbon atoms, and more particularly the open-chain aliphatic ethylenically unsaturated diamines have the amine groups on terminal carbon atoms and containing nor more than 12 carbon atoms.

The polybasic acid to be reacted with the above-described unsaturated polyamines may be any of those saturated or aromatic polycarboxylic acids described above for the preparation of the unsaturated alkyds.

Other unsaturated polyamides that may be used in the preparation of the novel epoxidized products but are less preferred than the above-described polyamides are those obtained by employing an unsaturated polycarboxylic acid with an unsaturated polyamine, or by reacting a mixture of saturated and unsaturated polycarboxylic acids with a saturated or unsaturated polyamine, or alternatively by reacting a saturated or unsaturated polycarboxylic acid with a mixture of saturated and unsaturated polyamines.

The unsaturated polyamides described above may be prepared by any suitable method. They are preferably prepared by merely reacting the polyamine or polybasic acid together at reaction temperatures varying from about 100° C. to 300° C., and removing the water formed during the reaction substantially as fast as it appears therein. Derivatives of polybasic acids, such as their lower alkyl esters and acid chlorides, may be used in this reaction and are sometimes preferred to the acids themselves. Generally it is unnecessary to add a catalyst but it may sometimes be helpful to add small quantities of inorganic substances of alkaline reaction, such as oxides and carbonates, and acid substances, such as halogen salts of polyvalent elements, e.g., aluminum, zinc, and tin, in order to speed the reaction.

The reaction may be carried out in the presence or absence of solvents or diluents. If solvents are employed they may be solvents for the reactants and non-solvents for the resulting unsaturated polymer or they may be solvents for both the reactants and polymer. Suitable solvents include, among others, benzene, xylene, toluene, cyclohexanone, phenol and the like, and mixtures thereof.

The proportion of reactants to be used in the preparation of the unsaturated polyamides will vary depending upon the properties desired in the finished product. Ordinarily the polybasic acid or derivative will be reacted with at least a chemical equivalent amount of the polyamine. A "chemical equivalent amount" as used herein in this regard refers to that amount of amine needed to furnish one NH₂ group for every carboxyl group. Preferably one reacts the acid with an excess to 30% excess of the polyamine.

Temperatures employed during the formation of the unsaturated polyamides will vary depending upon the reactants. In most cases, the temperature will vary from about 100° C. to 300° C. and more preferably from 150–275° C.

The water formed during the reaction is preferably removed during the reaction. This may be accomplished by azeotropic distillation with components, such as benzene and xylene, or by passing inert gases, such as carbon dioxide, through the mixture.

When the reaction is complete, the inert solvents or diluents, remaining water, uncombined reactants, etc., are removed from the reaction mixture. Removal is conveniently accomplished by vacuum distillation although other suitable means may be employed.

It is preferable to block off any remaining acid or amine groups before proceeding with the epoxidation step. By further reaction of the polyamide with acetic anhydride or ketene. The reactive amine groups will be converted to amides. Ethylene oxide, allyl glycidyl ether and other epoxides can be used to convert those polyamides with reactive carboxylic groups to hydroxy esters or reaction with monoamines will form the terminal amide linkage.

The preparation of several examples of the above-described unsaturated polyamides is given below.

POLYAMIDE A 11.6 parts of fumaric acid was heated with 18 parts of decamethylene diamine and 30 parts of phenol for 30 minutes at 150–160° C. and then for 20 minutes at 150–160° C. under 1–2 mm. absolute pressure to remove the phenol. A light-colored resin was obtained which melts at 45–50° C.

POLYAMIDE B

A mixture of 7.1 parts of muconic acid

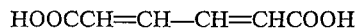

and 3.3 parts of ethylene diamine was dissolved in 50 parts of hot water. Sufficient ethylene diamine was added to make the solution neutral to litmus. The crystalline diamine-dibasic acid salt which separated upon cooling was dissolved in an equal weight of phenol and heated for 1.5 hours at 200–210° C. The phenol was then removed by 20 minutes additional heating under reduced pressure. A reddish brown, hard resin was formed which softened at about 61° C. The resin was dissolved in boiling dioxane and ketene gas passed in for 1 hour. Very little ketene was absorbed as shown by a ketene material balance.

POLYAMIDE C 11 parts of decamethylene diamine was heated for one hour at 200–225° C. with 14 parts of 1,4-dihydronaphthalene-1,4-dicarboxylic acid. The resulting polyamide was a clear, amber-colored resin having a softening point of 57° C. It was dissolved in benzene and further treated with ethylene oxide to block off the termined carboxylic acid groups.

POLYAMIDE D 100 parts of 2-butene-1,4-diamine is heated with 146 parts of adipic acid at 200° C. The resulting polyamide is a clear hard resin.

Another group of less preferred polyamides that may be epoxidized according to the process of the invention are those obtained by polymerization of unsaturated aminocarboxylic acids. In this case, the main carbon chain will contain a plurality of

linkages, with the unsaturated linkages being contained in the amino-substituted acid portion of the molecule. Amino-substituted acids that may be used in preparing these polyamides include, among others, 4-amino-2-butenoic acid, 4-amino-5-octenoic acid, 4,6-diamino-3-dodecanoic acid and the like. Particularly preferred members of this group comprise the amino-substituted alkenoic acids containing no more than 12 carbon atoms. The polyamides may be prepared from these amino-substituted acids in the same manner as described above for the preparation of the unsaturated polyamides.

Also coming within the scope of the present invention are the unsaturated polyester-polyamide such as those obtained by reacting polybasic acids with amino substituted alcohols. In this case, the unsaturated linkage may be present in the acid portion and/or the amino alcohol portion of the molecule. Suitable unsaturated polybasic acids may be exemplified by those described above for preparing the unsaturated polyesters and unsaturated polyamides, and the amino-alcohols, saturated and unsaturated, may be exemplified by the following 3-aminobutanol, 4-aminohexanol, 5-aminooctanol, 3,5-diamineododecanol, 4-amino-2-butenol, 5-amino-3-octenol and 4-amino-5,7-dodecadienol. These polyester-polyamide may be prepared under the conditions described hereinabove for preparing the polyamides, e.g., by heating the polybasic acid with the amino-substituted alcohols at temperatures between 100° C. and 300° C. with removal of water during the course of the reaction.

The preparation of such polyester-polyamides is illustrated below.

POLYESTER-POLYAMIDE A

A mixture of .5 mol of maleic acid and .5 mol of monoethanolamine is heated to 200° C. for 17 hours while continuously passing carbon dioxide through the reaction mixture. The resulting product is a solid amber-colored resin.

Still another group of unsaturated polymeric products that may be epoxidized according to the present invention include the unsaturated polycarbamates, i.e., polymers having repeating units of

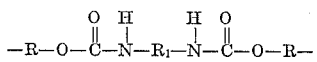

wherein R or $R_1$ are bivalent organic radicals either or both of which contain unsaturated linkages. These polycarbamates may be prepared by reacting polyhydric alcohols with polyisocyanates or by reacting polyamines with chloroformates, either or both of such reactants containing the necessary unsaturated linkages.

A preferred group of these unsaturated polycarbamates are those obtained by reacting polyamines with chloroformates of unsaturated polyhydric alcohols in the presence of material capable of absorbing the released hydrogen chloride. The polyamines used in the preparation of these unsaturated carbamates may be any of those described hereinabove for the preparation of the polyamides and are preferably the aliphatic and cycloaliphatic saturated polyamines containing no more than 18 carbon atoms, such as 1,4-hexanediamine, 1,8-octanediamine, 1,10-decanediamine, 1,18-octadecanediamine, 1,4-cyclohexanediamine, 1,3,5-hexanetriamine and the like.

The chloroformates of the unsaturated polyhydric alcohols are preferably those of the formula

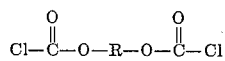

wherein R is derived from an unsaturated polyhydric alcohol by removing the hydroxyl groups. Examples of such unsaturated polyhydric alcohols include, among others, 2-butenediol-1,4, 2-(hydroxymethyl)-1-propen-3-ol, 2-(hydroxymethyl)-1-buten-3-ol, 1,5-hexadiene-3,4-diol, 2-butene-1,3-diol, 2,5-dimethyl-3-hexen-2,5-diol, cyclohexenediol-2,5, 3-chlorocyclohexenediol-2,5 and 3-methylcyclohexenediol-2,5. Preferred unsaturated polyhydric alcohols used for this purpose include the aliphatic ethylenically unsaturated dihydric alcohols containing no more than 12 carbon atoms.

These unsaturated polycarbamates are preferably prepared by a method described in U.S. 2,660,575 wherein a solution of the chloroformate in a water-immiscible organic solvent is dispersed in an aqueous diamine solution in the presence of a water-miscible organic solvent, and the reaction between the bis-chloroformate and the polyamine is caused to take place to produce the unsaturated polycarbamate.

The preparation of an unsaturated polycarbamate by the above method is illustrated below.

POLYCARBAMATE A

A solution of 17.6 parts by weight of tetramethylene diamine in 500 parts by weight of water is neutralized to a pH of 3–5. To this solution are added 450 parts by weight of water and 673 parts by weight of acetone and the solution cooled to 0 to 2° C. A solution of 42 parts by weight of 2-butenediol-1,4 bis chloroformate in 1082 parts by weight of toluene is added to the cooled diamine solution and the mixture stirred vigorously to form a dispersion. While continuing the stirring, there is added 250 parts by weight of a 3.24 normal aqueous NaOH solution and the stirring continued for an additional 10 minutes. The dispersion is permitted to stand to allow the polymer to separate, the polycarbamate is filtered off, purified by slurring alternately with water and acetone and dried at 100–110° C. in vacuum.

The preparation of an unsaturated polycarbamate by reaction of an unsaturated alcohol with a diisocyanate is illustrated below.

POLYCARBAMATE B 880 parts of 2-butenediol-1,4 is combined with 1620 parts of benzene diisocyanate and 1000 parts of dioxane and the mixture heated to 100° C. Dioxane was removed and the product concentrated to form a resinous polycarbamate.

Another group of unsaturated polymeric products that may be epoxidized according to the process of the invention are the unsaturated polymers containing sulfur linkages. A preferred group of these polymers include those obtained by reacting unsaturated organic dihalides and sodium sulfide Cl—R—Cl + Na₂S → —S—R—S—R—S—R— + NaCl to form a high molecular weight polymer containing a plurality of sulfide linkages. Unsaturated organic halides used for this purpose may be exemplified by 1,4-dichloro-2-butene, 1,5-dichloro-3-pentene, 1,6-dichloro-4-hexene, dichloroallyl ether, 1,5-pentanediol dichloroacrylate, 1,4-butenediol dichloropropionate and 1,3,4-trichlorocyclohexene-2. Other dihalides, such as the saturated dihalides and aromatic dihalides may also be employed in combination with the above-described unsaturated dihalides. Examples of these other dihalides include, among others, ethylene dichloride, propylene dichloride, dichloroethyl ether, triglycoldichloride, glycerol dichlorohydrin, dichloroethyl formal, dichloropropionic acid and the like.

Other sulfur-containing polymers may be obtained by reacting unsaturated polymercaptans, such as the alkenepolythiols as 2-butenedithiol, 4-octenedithiol, 4,6-octadienedithiol, 5-dodecenedithiol, and 2-cyclohexene-1,4-dithiol and oxy-containing polymercaptans as oxydibutenethiol, oxydihexenethiol and oxydidodecenethiol, with organic dihalides, polycarboxylic acid halides and polycarboxylic acids.

Other sulfur-containing polymers to be used in the process of the invention include sulfur-containing polyesters, polyamides or polyester-polyamides wherein one or more of the reactants contain sulfur-linkages. Sulfur-containing polycarboxylic acids that may be used in preparing such polymer include, among others, 3,3′-thiodipropionic acid, 4,4′-thiodibutyric acid, 4,4′-sulfonyldibutyric acid, 4,4′-thiodipentenoic acid, 7,8-dithia-1,10-decanedioic acid, and the like. Sulfur-containing polyhydric alcohols that may be used in preparing these polymers include among others, bis(2-methyl-4-hydroxybutyl) sulfide, bis(2-ethyl-5-hydroxyhexyl) sulfide, bis(2-hydroxyethyl) sulfide, bis(2-ethyl-4-hydroxyoctyl) sulfide, 5,7- dihydroxy-4-thiadecan-1-ol, 7-hydroxy-2,4-dithiadodecan-1-ol. Sulfur-containing polyamines that may be used in preparing these polymers include, among others, 4,6-dithiaoctane-1, diamine, 6-thiaheptane-1,7-diamine and 5-thia-8-dodecenediamine-1,10. These polymers may be prepared by the methods described above for the preparation of the other polyesters, polyamides and polyamide-polyesters.

The preparation of an unsaturated polymer containing sulfur linkages is illustrated below.

UNSATURATED SULFUR-CONTAINING POLYMER

About 267 parts of 4,4'-thiodibutanol and 116 parts of maleic acid and 1 part of p-toluenesulfonic acid are mixed together and the mixture heated to about 180° C. and held at that temperature until the acid number has been reduced below 30. A slow stream of carbon dioxide is sent through the charge to eliminate the air and carry away the water of esterification. The excess 4,4'-thiodibutanol is removed under reduced pressure. The resulting product is a light yellow resin.

Preferred silicon-containing polymers are those obtained by reacting silicon-containing polycarboxylic acids, such as dicarboxyphenyldimethylsilane

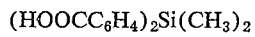

with unsaturated polyhydric alcohols, or unsaturated amines, such as 2-butenediol-1,4, 2-cyclohexenediol-1,4, 1,6-hexenediamine, 2-(hydroxymethyl)-1-propen-3-ol, and other unsaturated alcohols and amines as listed above. The preparation of this type of unsaturated silicon-containing polymer is illustrated below.

UNSATURATED SILICON-CONTAINING POLYMER 300 parts of dicarboxyphenyldimethylsilane and 176 parts of 2-butenediol-1,4 are mixed and heated at 135° C. for 4 hours and at 160° C. for 2 hours. The resulting polyester is a soft thermoplastic solid.

Other preferred silicon-containing polymers are those obtained by reacting an unsaturated polybasic acid with a silane-alcohol reaction product as described in U.S. 2,628,215. Unsaturated polycarboxylic acids that may be used for this purpose include, among others, maleic acid, fumaric acid, aconitic acid, 2-butenedioic acid, and others described hereinabove. A preparation of unsaturated silicon-containing polymers of this type is illustrated in Examples 2 and 3 of above-noted U.S. 2,628,215.

Preferred phosphorus-containing polymers are those obtained by reacting a phosphorus-containing polybasic acid, such as phosphorous acids

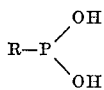

phosphonic acids

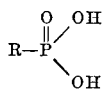

and phosphorous acid acid

wherein R is an organic radical, with unsaturated alcohols or amines. Examples of such polybasic acids include, among others, benzenephosphonic acid, benzenethiophosphonic acid, cyclohexanephosphonic acid, propanephosphonic acid, 2,3,4-trimethylpentanephosphonic acid, and 2-phenylethanephosphonic acid. The unsaturated alcohols and amines used in preparing these polymers may be any of those described above. These polymers may be prepared by the above-described methods for preparing polyesters.

The preparation of an unsaturated polymer containing phosphorus is illustrated below.

UNSATURATED PHOSPHORUS-CONTAINING POLYMER 12.7 parts of benzenephosphonic acid and about 20 parts of 2-cyclohexenediol-1,4 are slowly heated to 200° C. and held there for 3 hours. A slow stream of pure nitrogen is used to sweep out water of reaction. At the end of the reaction period, the product is distilled under vacuum to remove all volatiles. On cooling a hard clear pale colored polyester is obtained having a Durrans' melting point over 100° C. and being soluble in a mixture of toluene and tetrahydrofuran.

Other preferred phosphorus containing polymers are those obtained by reacting unsaturated phosphorus-containing acid, such as 3-octenephosphonic acid, 3-butenephosphorus acid and 3-cyclohexenephosphonic acid, with polyhydric alcohols as described above.

The unsaturated polymers used in the preparation of the novel epoxidized products preferably have molecular weights between about 2000 and 5000 but those between 5,000 to 50,000 have also proved very valuable. The lower molecular weights, e.g., those below 5,000 are determined by conventional method as ebullioscopically in solvents as benzene. The higher molecular weights are determined by measuring the intrinsic viscosity of the polymer in solution and calculating the molecular weight as discussed by Flory in J.A.C.S. 65, 372 (1943).

The epoxidation of the unsaturated polymeric products is accomplished by treating the polymers with an epoxidizing agent. Organic peracids, such as performic, peracetic, perbenzoic acid and monoperphthalic acid, and the like, are preferred agents for this reaction.

The amount of the epoxidizing agent employed will vary over a considerable range depending on the type of product desired. In general, one should employ at least one mole of the oxidizing agent, such as perbenzoic acid, for every unsaturated group to be epoxidized. In some cases, it is rather difficult to effect epoxidation of all of the unsaturated bonds and if a completely epoxidized product is required, additional epoxidizing agent and/or longer reaction period may be required.

It is preferred to carry out the epoxidation reaction in a suitable mutual solvent for the reactants and product. Chloroform is an especially useful solvent for the purpose, but other materials, such as ethyl ether, dichloromethane, benzene, ethyl acetate, etc., and the like, may be used.

The temperature employed during the epoxidation may vary over a considerable range depending upon the type of reactants and oxidizing agents selected. It is generally desirable to maintain the temperature between −20° C. to about 80° C. Atmospheric, superatmospheric, or subatmospheric pressures may be employed as desired.

The epoxidized polymeric product obtained by this method may be recovered from the reaction mixture by any convenient means known to the art, such as distillation, extraction, fractional precipitation and the like.

The epoxidized polymeric products of the invention will vary in physical form depending upon the nature of the basic polymeric material. In most cases, the resulting product will be viscous liquids to semi-solids. The products will possess a plurality of active epoxy groups and in some cases may contact unreacted unsaturated linkages. In this latter case, the products may be further reacted through the epoxy groups and/or unsaturated linkages.

The presence of the plurality of epoxy groups along the chain in combination with the presence of the other features, such as the presence of the O, S or N, P and Si groups endows the products with many new and unobvious properties. The new products, for example have improved compatibility with oils and resins and are more easily cured through the epoxy groups. The products of the invention are thus ideally suited for preparing improved surface coating compositions of the air-drying or baking type. In utilizing the products in this application, it is generally desirable to combine the epoxidized polymeric product with the epoxy curing agent and, if desired solvents or other film-forming materials, and then applying the resulting mixture to the surface to be coated. The coatings prepared in this manner may be allowed to set to a hard finish or heat may be applied to hasten the cure.

The products of the invention also have good adhesive properties and are of great value in the preparation of adhesive and impregnating compositions. In utilizing the products for these applications, it is generally desirable to combine the epoxidized polymeric product, with a suitable solvent or diluent, such as benzene, toluene, propionitrile, crotonitrile, benzonitrile, and the like, and a curing agent, so as to form a spreadable fluid and homogeneous mixture, and then applying the resulting mixture to the desired surface. Adhesive compositions prepared in this manner are suitable for uniting various surfaces, such as, for example, wood to wood, wood to metal, metal to metal, rubber to metal or any combination therof. After the application has been made, the adhesive may be allowed to set at room temperature or heat may be applied to hasten the cure.

The products of the invention also find use in the preparation of pottings and they may be cured to form hard castings. These products are generally prepared by mixing the epoxidized polymeric products with the curing agent and then adding this mixture to the desired mold or casting containing electrical wires or apparatus and then allowing the mixture to stand. After a short period, the mixture sets up to form the desired hard flexible casting. Heat may also be applied.

The curing of the epoxidized products of the present invention in the above-noted applications may be accomplished by the addition of epoxy curing agents. These agents include Friedel-Crafts catalysts, such as aluminum chloride, aluminum bromide, zinc chloride, boron trifluoride, silicon tetrachloride, stannic chloride, stannic bromide, titanium tetrachloride; amines, such as ethylene diamine, 2,4,6 - tri(dimethylaminomethyl) - phenol, amine aldehyde resins, amide-aldehyde resins, dialdehydes, poly-basic acids such as organic and mineral acids, and their anhydrides, polymercaptans, and the like. These catalysts are preferably employed in amounts varying from about .1% to 5% by weight of the material being polymerized. In many cases, the polymerization may be effected by merely adding the catalysts, but in some cases it may be necessary to heat to a temperature varying preferably from about 30° C. to 80° C.

The epoxidized products of the present invention may be used in the above application by themselves or may be used in combination with other epoxy-containing materials. Such epoxy materials include epichlorohydrin, glycidol, butadiene dioxide, diglycidyl ether, allyl glycidyl ether, glycidyl ethers of polyhydric phenols, such as those obtained by reacting epichlorohydrin with polyhydric phenols as bis-phenol-A, and resorcinol, glycidyl ethers of polyhydric alcohols, such as those obtained by reacting epichlorohydrin with glycerol, sorbitol and hexanetriol, and dehydrochlorinating the resulting product, and glycidyl esters, such as diglycidyl phthalate, diglycidyl adipate, diglycidyl succinate and the like. These dissimilar materials are preferably employed in amounts varying from about 2% to 90% by weight of the material being polymerized.

The epoxidized products of the invention also find application as intermediates in the preparation of other valuable chemical products. As they possess epoxy groups, they may be hydrated to form glycols, or may be reacted with monofunctional agents, such as monocarboxylic acids to produce derivatives which are valuable as plasticizers, lubricating oils, drying oils and the like. Such acids may be exemplified by acetic, butyric, caproic, capric, stearic, palmitic, lauric, myristic, benzoic acid, isopropylbenzoic acid, toluic acid, acids derived from drying and semi-drying oils as acids derived from linseed, soybean, perilla, oiticia, tung, walnut, dehydrated castor oil, as well as rosin acids, such as abietic acid, and the like.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

*Example I*

This example illustrates the preparation of an epoxidized unsaturated alkyd resin by reacting Polyester B described above with perbenzoic acid.

50 parts of Polyester B was added to 100 parts of chloroform. 500 parts of 10% perbenzoic acid solution was added to the mixture and the mixture allowed to stand at room temperature. The product was then washed with dilute sodium carbonate solution and filtered. The chloroform was then stripped off and the product concentrated to a viscous liquid having a high epoxy value.

A xylene solution of the above epoxidized product (40% solids) containing 5 parts of diethylene triamine is spread on steel panels and heated to 60° C. for 30 minutes. The resulting film is very hard and mar resistant.

About 100 parts of the above-described epoxidized alkyd are combined with 10 parts of phthalic anhydride and 5 parts of ethylene diamine and the mixture heated to 60° C. The resulting mixture sets up in a short time to hard clear casting.

The above-described epoxidized alkyd also reacts with 25% by weight of soybean oil fatty acids to form a thick oil which dries in the presence of 0.5% cobalt drier to form hard solvent resistant films.

*Example II*

This example illustrates the preparation of an epoxidized unsaturated alkyd by reacting Polyester A described above with peracetic acid.

360 parts of the Polyester A was dissolved in 300 parts of benzene, 16 parts of sodium acetate added and then 208 parts of a 27% peracetic acid solution slowly added. The mixture was allowed to warm to 23° C. and then let stand overnight. The product was water washed and the volatile components were stripped off at 100° C. (1 mm.) to yield a viscous liquid epoxidized product having a molecular weight of about 21,000, Iodine No. 34 and an epoxy value of .092 eq./100 g.

A xylene solution of the above epoxidized product containing 5 parts of 2,4,6-tri(dimethylaminomethyl)phenol is spread on steel panels and heated to 70° C. The resulting films are very hard and mar resistant.

About 50 parts of the above-described epoxidized product are combined with 50 parts of 2,2-bis(2,3-epoxypropoxyphenyl) propane and 5 parts of 2,4,6-tri(dimethylaminomethyl) phenol and the mixture heated to 60° C. In a short period the mixture sets up to a hard flexible casting.

*Example III*

This example illustrates the preparation of an epoxidized unsaturated alkyd resin by reacting Polyester C with peracetic acid.

500 parts of Polyester C was combined with 200 parts of benzene and 8 parts of sodium acetate and the mixture cooled to 6 to 9° C. 300 parts of 40% peracetic acid solution was then added thereto over 30 minutes. The mixture was allowed to warm to 20° C. over a period of 4 hours and washed with water. The mixture was then distilled to remove the benzene. The resulting product was a light brown viscous oil having a high epoxy value.

A xylene solution of the above epoxidized alkyd is combined with 5 parts of diethylene triamine and the mixture spread out on steel panels and cured at 60° C. The resulting films are very hard and mar resistant.

About 50 parts of the above-described epoxidized product is combined with 50 parts of a condensation product of epichlorohydrin and bis-phenol-A having a molecular weight of 482, a melting point of 27° C. and an epoxy value eq./100 g. of 0.40, and 5 parts of 2,4,6-tri(dimethylaminomethyl)phenol and the mixture heated to 60° C. The resulting product is a hard flexible casting.

*Example IV*

This example illustrates the preparation of an epoxidized unsaturated polyamide by reacting Polyamide A with peracetic acid.

700 parts of Polyamide A is combined with 2000 parts of chloroform. 700 parts of a 27% peracetic acid solution is then added to the mixture and the mixture allowed to stand at 0° to 10° C. for 10 hours. The product is then washed with ice water, cold 20% sodium hydroxide and more ice water. Chloroform is then taken off to form a solid resin having a high epoxy value.

A xylene solution of the above-described epoxidized polyamide containing 5 parts of diethylene triamine is spread on steel panels and heated to 60° C. for 30 minutes. The resulting film is very hard and mar resistant.

40 parts of the above-described epoxidized polyamide is then mixed with 60 parts of 2,2-bis(2,3-epoxypropoxyphenyl) propane and the mixture diluted with acetonitrile to form a spread paste. This mixture acts as an adhesive to bond steel and aluminum surfaces.

Similar epoxidized products may be obtained by replacing the Polyamide A in the above-described procedure with equivalent amounts of Polyamide B and Polyamide C.

*Example V*

This example illustrates the preparation of an epoxidized unsaturated polycarbamate by reacting Polycarbamate A with peracetic acid.

700 parts of Polycarbamate A is combined with 1000 parts of chloroform. 700 parts of a 27% peracetic acid solution is then added to the mixture and the mixture allowed to stand at 0° C. to 10° C. overnight. The product is then washed with ice water, cold 20% sodium hydroxide and then more ice water. Chloroform is then taken off and the product concentrated to form a resinous product.

40 parts of the above-described epoxidized polycarbamate is mixed with 60 parts of 2,2-bis(2,3-epoxypropoxyphenyl) propane and the mixture diluted with acetotnitrile to form a spreadable paste. This mixture acts as an adhesive to bond steel and aluminum surfaces.

A xylene solution of the above-described epoxidized polycarbamate containing 5 parts of diethylene triamine is spread on steel panels and heated to 60° C. for 30 minutes. The resulting film has good adhesion and is hard and flexible.

Epoxidized products having related properties may be obtained by replacing polycarbamate in the above-described procedure with equivalent amounts of Polycarbamate B.

*Example VI*

This example illustrates the preparation of an epoxidized unsaturated sulfur-containing polymer.

500 parts of the polyester of 4,4'-thiodibutanol and maleic acid prepared as shown above is combined with 200 parts of benzene and 8 parts of sodium acetate and the mixture cooled to 6 to 9° C. 400 parts of 40% peracetic acid solution is then added thereto over 30 minutes. The mixture is allowed to warm to 20° C. over a period of 4 hours and washed with water. The mixture is then distilled to remove the benzene. The resulting product is a light pale colored resin having a high epoxy value and having some of the thio linkages converted to sulfone groups.

A xylene solution of the above epoxidized product is combined with 5 parts of diethylene triamine and the mixture spread out on steel panels and cured at 60° C. The resulting films are very hard and mar resistant.

*Example VII*

This example illustrates the preparation of an epoxidized unsaturated silicon-containing polymer.

50 parts of the reaction product of dicarboxyphenyldimethylsilane and 2-butenediol-1,4 produced as described above is combined with 100 parts of chloroform. 500 parts of 10% perbenzoic acid solution is added to the mixture and the mixture allowed to stand at room temperature. The product is then washed with dilute sodium carbonate solution and filtered. The chloroform is then stripped off to form a solid resinous solid having high epoxy value.

About 50 parts of the above-described epoxidized product is combined with 50 parts of 2,2-bis(2,3-epoxypropoxyphenyl) propane and 5 parts of 2,4,6-tri(dimethylaminomethyl)phenol and the mixture heated to 60° C. In a short period, the mixture sets up to form a hard flexible casting.

An epoxidized silicon-containing polymer having related properties is obtained by replacing the dicarboxyphenyldimethylsilane-2-butenediol reaction product in the above process with equivalent amounts of the silicon-containing polymer prepared as shown in Example 2 of U.S. 2,628,215.

*Examples VIII*

This example illustrates the preparation of an epoxidized unsaturated polymer containing phosphorus.

700 parts of the benzenephosphonic acid/2-cyclohexenediol-1,4 reaction product described above is combined with 2000 parts of chloroform. 700 parts of a 27% peracetic acid solution is then added to the mixture and the mixture allowed to stand at 0° C. to 10° C. for 10 hours. The product is then washed with ice water, cold 20% sodium hydroxide and more ice water. Chloroform is then taken off to yield a solid resin having a high epoxy value.

A xylene solution of the above-described epoxidized resin containing 5 parts of diethylene triamine is spread on steel panels and heated to 60° C. for 30 minutes. The resulting film is very hard and flexible.

I claim as my invention:

1. A polyepoxide comprising a condensation polymer selected from the group consisting of polyesters and polyamides, each member of said group having a main polymer chain containing, in addition to carbon, a dissimilar element of the group consisting of oxygen, nitrogen, sulfur, phosphorous and silicon in at least two different locations in the chain, each of the polyesters and polyamides containing at least two internal

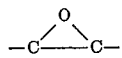

groups and said

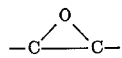

groups being located at the former site of carbon-to-carbon unsaturated linkages in the condensation polymer.

2. A polyepoxide as in claim 1 wherein the condensation polymer is an ethylenically unsaturated polyester.

3. A polyepoxide as in claim 1 wherein the condensation polymer is an ethylenically unsaturated polyamide.

4. A polyepoxide as in claim 1 wherein the condensation polymer is a polyester reaction product of a polyhydric alcohol and polyisocyanate.

5. A polyepoxide as in claim 1 wherein the condensation polymer is an ethylenically unsaturated silicon-containing polyester.

6. A polyepoxide as in claim 1 wherein the condensation polymer is an ethylenically unsaturated polyamide-polyester.

7. A polyepoxide as in claim 1 wherein the condensation polymer is an ethylenically unsaturated phosphorus-containing polyester.

8. A polyepoxide comprising a fatty acid modified polyhydric alcohol-polybasic acid alkyd resin, said alkyd resin having a molecular weight below about 50,000 and having at least two internal

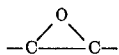

group which groups are located at former sites of carbon-to-carbon unsaturated linkages.

9. A polyepoxide comprising a polyamide of an ethylenically unsaturated aliphatic polycarboxylic acid and an aliphatic polyamine, said polyamide having a molecular weight below about 50,000 and having at least two internal

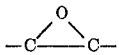

groups which groups are located at former sites of carbon-to-carbon unsaturated linkages.

10. An insoluble infusible product obtained by contacting the polyepoxide defined in claim 1 with an epoxy curing agent.

11. A polyepoxide comprising a polyester reaction product of an ethylenically unsaturated aliphatic polyhydric alcohol and a polyisocyanate, said polyester reaction product having a molecular weight below about 50,000 and having at least two internal

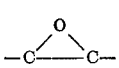

groups, said

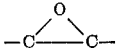

groups being located at the former site of carbon-to-carbon unsaturated linkages present in the said polyester reaction product.

12. A polyepoxide comprising a polyester reaction product of an alkenediol and a polycarboxylic acid, said polyester having a molecular weight below 50,000 and having at least two internal

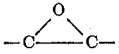

groups and said

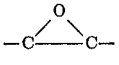

groups being located at the former site of carbon-to-carbon unsaturated linkages in the said polyester.

13. A polyepoxide comprising a polyester of glycerol, phthalic anhydride and an ethylenically unsaturated fatty acid, said polyester having a molecular weight below about 50,000 and having at least two internal

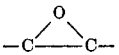

groups and said

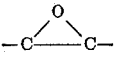

groups being located at the former site of carbon-to-carbon unsaturated linkages present in the said polyester.

14. A polyepoxide comprising a polyester of 2-butenediol and adipic acid, said polyester having a molecular weight below about 50,000 and having at least two internal

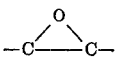

group and said

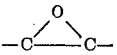

groups being located at the former site of carbon-to-carbon unsaturated linkages in the said polyester.

15. A polyepoxide comprising a polyamide of fumaric acid and decamethylene diamine, said polyamide having a molecular weight below about 50,000 and having at least two internal

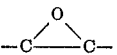

groups and said

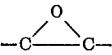

groups being located at the former site of carbon-to-carbon unsaturated linkages in the said polyamide.

16. A polyepoxide comprising a polyester reaction product of 2-butenediol-1,4 and benzene diisocyanate, said polyester having a molecular weight below about 50,000 and having at least two internal

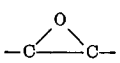

groups which groups are located at former sites of carbon-to-carbon unsaturated linkages.

17. A process for preparing epoxidized polymeric products which comprises reacting at −20° C. to +80° C. an unsaturated condensation polymer of the group consisting of polyesters and polyamides, said members of the aforesaid group having a molecular weight below about 50,000, having a main polymer chain containing, in addition to carbon, a dissimilar element of the group consisting of oxygen, nitrogen, sulfur, phosphorus and silicon in at least two different locations in the chain, and having a plurality of internal aliphatic carbon-to-carbon unsaturated linkages, with at least two moles of an organic peracid per mol of polymer to convert at least two of the unsaturated linkages in the polymer to

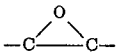

groups.

18. A high molecular weight resinous polyester consisting of repeating units of the formulae (A)

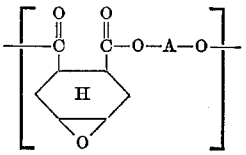

and (B)

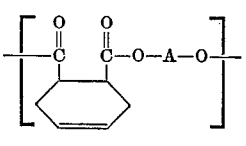

in which A represents a divalent saturated aliphatic hydrocarbon radical.

(References on following page)

References Cited by the Examiner

UNITED STATES PATENTS

| | | | |
|---|---|---|---|
| 2,566,206 | 8/1951 | Hyman | 260—75 |
| 2,581,464 | 1/1952 | Zech | 260—75 |
| 2,660,563 | 11/1953 | Banes et al. | 260—2 |
| 2,671,771 | 3/1954 | Simons | 260—75 |
| 2,682,514 | 6/1954 | Newey | 260—18 |
| 2,720,500 | 10/1955 | Cody | 260—22 |
| 2,731,429 | 1/1956 | Cody | 260—22 |

OTHER REFERENCES

Swern, Chem. Reviews, vol. 45, August 1949, pp. 16–25, 260-348.5A.

WILLIAM H. SHORT, *Primary Examiner.*

JOSEPH R. LIBERMAN, WILLIAM G. BENGEL, PHILLIP MANGAN, MILTON STEARMAN, HAROLD BURSTEIN, *Examiners.*

A. P. MENTIS, L. P. QUAST, *Assistant Examiners.*